3,755,536
ISOTYPIC BORATES OF ALUMINUM, RHODIUM AND THALLIUM OF CALCITE-TYPE CRYSTAL STRUCTURE
Tom Allen Bither, Jr., Wilmington, Del., assignor to E. I. du Pont de Nemours and Company, Wilmington, Del.
No Drawing. Filed July 27, 1971, Ser. No. 166,622
Int. Cl. C01b 35/00
U.S. Cl. 423—279    5 Claims

ABSTRACT OF THE DISCLOSURE

Disclosed herein are isotypic borates of aluminum, $AlBO_3$, rhodium, $RhBO_3$, and thallium, $TlBO_3$, each having the calcite-type crystal structure; a process for making them employing high temperature and high pressure and use(s) of said borates.

BACKGROUND OF THE INVENTION

(1) Field of the invention

This invention relates to novel $AlBO_3$, $RhBO_3$ and $TlBO_3$.

(2) Description of the prior art

A number of trivalent metal oxides form borates of formula $MBO_3$ when heated at atmospheric pressure with an excess of $B_2O_3$. Some of these have the calcite-type structure with trigonal symmetry in space group $R\bar{3}c$, see for example, Bernal et al., Acta Cryst., 16, 849 (1963). With still other trivalent metals, borates of calcite-type structure have been prepared using vapor transport techniques in sealed quartz tubes, Schmid, Acta Cryst., 17, 1080 (1964).

In the case of aluminum, borates rich in aluminum are formed preferentially even when excess $B_2O_3$ is present. Thus, compounds ranging from $2Al_2O_3 \cdot B_2O_3$ to $$9Al_2O_3 \cdot B_2O_3$$

are obtained at pressures ranging from subatmospheric to 5 kbars. The only equimolar combination, $AlBO_3$, occurs in nature as the rare mineral jeremejevite, and has been synthetically obtained in an explosively pressurized reaction. This particular known $AlBO_3$, however, is relatively soft (Moh's hardness 6.5, equivalent to a Knoop hardness of about 700), scarcely scratching glass. It has a well recognized X-ray pattern and hexagonal symmetry corresponding to space group $P6_3/m$. with a unit cell $a=8.538$ A., $c=8.171$ A., as shown in Dana's System of Mineralogy, 7th ed., vol. II, p. 330, John Wiley & Sons, Inc., New York.

No rhodium borate of any type has been reported. No borate of trivalent thallium, $TlBO_3$, is known.

SUMMARY OF THE INVENTION

The novel compounds of this invention have the formula $MBO_3$, wherein M is a metal selected from the group consisting of aluminum, rhodium and thallium. The novel compounds are characterized by their calcite-type crystal structure with rhombohedral symmetry corresponding to space group 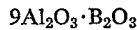. They are further characterized by their high hardness which makes them useful, inter alia, as abrasives for polishing metal surfaces. The novel compound are stable at ambient pressure, even at elevated temperatures.

The unit cell dimensions of the novel calcite-type compounds on the basis of hexagonal indexing are as follows:

$AlBO_3$,
  $a=4.46$ A.
  $c=13.75$ A.
$RhBO_3$,
  $a=4.64$ A.
  $c=14.35$ A.
$TlBO_3$,
  $a=4.93$ A.
  $c=15.99$ A.

A deviation in the cell dimensions of up to $\pm 0.01$ A. of the dimensions given above, which otherwise are as defined herein, are contemplated to fall within the scope of this invention.

The novel process of this invention comprises reacting a borate compound with a source compound of one of the elements selected from the group consisting of aluminum, rhodium and thallium. Reaction conditions include elevated temperatures and pressures of at least about 10 kbars. Temperatures should be in the range of about 800° C. to 1200° C. to produce the novel $AlBO_3$ and $RhBO_3$, and in excess of 600° C. to produce $TlBO_3$.

It has been found that the crystal lattice of the novel compounds may have small amounts of about 1% or less of other cations incorporated therein without substantial change in the unit cell dimensions. $AlBO_3$, $RhBO_3$ and $TlBO_3$ containing small amounts of trivalent cations of similar size are within the scope of this invention. Small amounts of the trivalent cations, such as chromium and europium, act as dopants and foster luminescent activity in $AlBO_3$.

DETAILS OF THE INVENTION

Reactants suitable as a source of aluminum include $Al_2O_3$, $Al(OH)_3$, $Al(NO_3)_3 \cdot 9H_2O$, $AlCl_3 \cdot 6H_2O$, and the like.

Borates suitable for reaction with the aluminum source compounds include $NaBO_2 \cdot 4H_2O$, $Na_2B_4O_7 \cdot 10H_2O$, $B_2O_3$, $H_3BO_3$, and the like. It has been found that when the atom ratio of Al:B in the starting reactants varies from about 1:1.25 to 1:2, the excess borate favors the reaction of all the Al, has a beneficial fluxing action for crystal growth and can be easily removed from the resultant $AlBO_3$ by extraction with hot water.

Pressure is a critical variable in the preparation of $AlBO_3$ and should be maintained at between 10 and 65 kbars during the reaction. Reactions run at lower pressures of, say, 3 to 5 kbars have not produced the novel product nor have solid state reactions at atmospheric pressures.

Operable temperatures fall in the range of 800° to 1200° C. $AlBO_3$ is produced at a temperature of 800° to 1200° C. and a pressure of 10 to 65 kbars, but is not produced when the temperature is only 600° C., even though the pressure is maintained at between 10 to 65 kbars.

Quenches through rapid air-cooling of the confining pistons and slow cools such as 100° to 200° C. per hour furnace cooling can be utilized. A reaction time of 2 hours at reaction temperature has been employed prior to a period of slow cooling. It is preferred to use longer times of, for instance, 6 to 8 hours at reaction temperature when quenching is employed.

AlBO$_3$ can be obtained in an assortment of crystalline habits, including colorless powders, platelets, polyhedra, and rhombs, all of which show an X-ray pattern characterized by the space group and unit cell dimensions discussed herein. In connection with crystal growth, it has been found that the presence of some water during reaction leads to controlled growth through the fluxing activity of the water.

The novel compounds of this invention are extremely hard and because of this property are useful, inter alia, as abrasives for grinding and polishing metal surfaces and the like and can be utilized for such purposes in an appropriate device such as an emery wheel. Metal surfaces can be polished by a process comprising contacting the metal surfaces with the novel compounds and changing the relationship of the compounds to the contacting surfaces while maintaining the contact. An emery wheel is a contemplated device for presenting the novel compounds to the metal surfaces.

Doping of AlBO$_3$

It is contemplated that the AlBO$_3$ of the invention may contain up to one atom percent based on aluminum of chromium or europium in order to provide luminescent activity. These doped compositions have utility in display devices when irradiated with ultraviolet light, cathode rays, and the like.

By formation of AlBO$_3$, under the temperature and pressure conditions described above and in the presence of traces of Cr$_2$O$_3$, doping of AlBO$_3$ may be achieved so as to give pale pink crystals of AlBO$_3$:Cr having the same structure and essentially the same cell size as the unmodified host. This material luminesces red under 3660 A. ultraviolet excitation and red-orange when excited by low voltage ions in vacuo. Doping may also be achieved in a similar manner using traces of Eu$_2$O$_3$. Colorless crystals of calcite-type AlBO$_3$:Eu can be obtained that luminesce red-orange under 2537 A. ultraviolet excitation. The concentration of the doping element is preferably kept in the range of 0.2 to 1.0 atom percent based on aluminum in order to obtain useful luminescent activity.

Reactants useful as sources of rhodium include Rh$_2$O$_3$, Rh$_2$O$_3$·5H$_2$O, RhCl$_3$ and the like. The rhodium compound is reacted with borates such as H$_3$BO$_3$, B$_2$O$_3$, NaBO$_2$·4H$_2$O and the like, to produce the novel RhBO$_3$ of this invention. Pressures and temperatures are similar to those employed in producing AlBO$_3$. The atom ratio of Rh:B in the starting reactants is best maintained at from 1:1.5 to 1:4. Extraction with hot water separates the uncombined borates from the insoluble deep red-brown prismatic crystals of RhBO$_3$.

TlBO$_3$ is also prepared at high pressures of 10 to 65 kbars by combining borates such as H$_3$BO$_3$, B$_2$O$_3$, NaBO$_2$·4H$_2$O and the like, preferably in stoichiometric excess, with thallic compounds such as Tl$_2$O$_3$, Tl(NO$_3$)$_3$ and the like. Alternatively, the source of thallium may be monovalent compounds if oxidizing conditions prevail. Thus, TlNO$_3$ may be used as a source of thallium since the nitrate ion can oxidize Tl$^{+1}$ to Tl$^{+3}$ under the high temperature, high pressure reaction conditions. Even under high pressure, temperatures in excess of 600° C. are required to produce TlBO$_3$.

Pressure equipment

The high pressure necessary for these reactions was obtained in certain cases by using a tetrahedral anvil pressure device as described by E. C. Lloyd et al., Jour. of Res., Nat. Bureau Stds. 63C, 59 (1959). In this device, the reactant are placed in a gold or platinum container which fits in a graphite sleeve that serves as a resistance heater. This assembly is enclosed in a pyrophyllite tetrahedron and is placed in the anvil device which is capable of generating pressures in excess of 65 kbars. The four calibration points used to determine pressure developed in this device appear in the 1963 edition of the American Institute of Physics Handbook, Part 4, p. 43, as follows:

| | Kbars |
|---|---|
| Bismuth I→II | 25.37±0.02 |
| Bismuth II→III | 26.96±0.18 |
| Thallium II→III | 36.69±0.11 |
| Barium II→III | 59.0±1.0 |

Other reactions under high pressure were carried out in a piston-cylinder device as described by Boyd and England, J. Geophys. Res. 65, 741–8 (1960). In this device, the reactants are either contained directly in a boron nitride capsule or in a sealed container made of platinum or gold tubing 0.005" to 0.0115" thick, placed in the boron nitride cup which fits in a graphite sleeve that serves as a resistance heater. This assembly is enclosed in a cylindrical talc sleeve which insulates the heater from the wall of the pressure vessel. Pressures in excess of 30 kbars can be generated in this device. The calibration points used to determine pressure developed in this device are as follows:

American Institute of Physics Handbook, Part, 4, p. 43, 1963 Edition,

Bismuth I→II at room temperature—25.37±0.02 kbars
Bridgman, J. Chem. Phys. 5, 965 (1937),
Water VI→VII at room temperature—22.50 kbars
Bridgman, Proc. Am. Acad. Arts and Sci. 47, 521 (1911),
Water I→VI at room temperature—9.55 kbars
Rapoport & Kennedy, J. Phys. Chem. Solids 26, 1996 (1965),

| | Kbars |
|---|---|
| Potassium nitrate III→IV at 250° C. | 10.4 |
| Potassium nitrate III→IV at 178° C. | 7.3 |
| Potassium nitrate I→III at 250° C. | 5.5 |
| Potassium nitrate I→III at 178° C. | 2.4 |
| Potassium nitrate II→IV at room temp. | 3.0 |

Bridgman, Phys. Rev. 3, 175 (1914),

| | Kbars |
|---|---|
| Carbon tetrachloride I→II at room temp. | 3.53 |
| Carbon tetrachloride II→III at room temp. | 6.96 |

With each pressure apparatus, the reactant mixtures were compressed in the cold assembly, and were then heated to the desired temperature indicated by an appropriate thermocouple. No pressure correction for thermocouple behavior has been introduced, standard e.M.f. tables for 1 atmosphere being employed. The pressure unit is a bar, equivalent to 10$^6$ dynes/cm.$^2$. The larger unit, a kilobar, kbar, equal to 1000 bars, is used herein.

PREFERRED EMBODIMENTS

The following examples are meant to illustrate but not to limit the invention. In each of the tables, an intensity of 100 is assigned to the strongest lines of the pattern. In the Guinier patterns of Tables III and IV, the 110 reflection was masked by the internal standard.

EXAMPLE 1

A 0.166 g. pellet made from a mixture of 0.143 g. (1.40 mmoles) of Al$_2$O$_3$ and 0.156 g. (2.24 mmoles) of B$_2$O$_3$, and contained in a platinum capsule was pressured to 65 kbars in a tetrahedral anvil device and heated for 2 hours at 1200° C., slow cooled for 4 hours to 400° C., and thereafter quenched to room temperature. The resultant product was then extracted with hot water to remove soluble impurities. A microcrystalline, off-white solid was isolated. A Debye-Scherrer X-ray diffraction powder pattern, Table 1 below, was obtained thereon that was indexed, after deletion of several weak unidentified lines, on the basis of a calcite-type unit cell (R$\bar{3}$c extinctions) with hexagonal indices, $a=4.46$ A., $c=13.75$ A., indicative of the compound AlBO$_3$.

Five grams of Al$_2$O$_3$-B$_2$O$_3$ mixed in the same proportions as above was sealed in a platinum tube, pressured to 3 kbars, heated 2 hours at 1500° C., and slow cooled to room temperature. At this pressure, the known borate $9Al_2O_3 \cdot 2B_2O_3$ was formed rather than calcite-type $AlBO_3$.

EXAMPLE 2

A 0.158 g. pellet made from a mixture of 0.750 g. (2.0 mmoles) $Al(NO_3)_3 \cdot 9H_2O$ and 0.139 g. (2.0 mmoles) $B_2O_3$, and contained in a gold capsule was pressured to 65 kbars in a tetrahedral anvil device, heated for 6 hours at 800° C., and quenched to room temperature. After extracting the resultant product with warm water to remove soluble impurities, clear, colorless crystals having a polyhedral shape were isolated. A Debye-Scherrer X-ray diffraction powder pattern obtained therein, Table II below, was indexed in the manner of Example 1 on the basis of a single-phase, calcite-type unit cell ($R\bar{3}c$ extinctions) with hexagonal indices, $a=4.463$ A.; $c=13.746$ A., indicative of the compound $AlBO_3$.

Four grams of an $Al(NO_3)_3 \cdot 9H_2O$-$B_2O_3$ mixture in a 1:1 mole ratio was sealed in a gold tube, pressured to 3 kbars, heated for 8 hours at 800° C., and quenched to room temperature. At this pressure, the known borate $9Al_2O_3 \cdot 2B_2O_3$ was formed rather than calcite-type $AlBO_3$.

EXAMPLE 3

A 0.255 g. pellet made from a mixture of 1.872 g. (24.0 mmoles) of $Al(OH)_3$ and 1.149 g. (16.5 mmoles) of $B_2O_3$, and contained in a welded platinum capsule was pressured to 30 kbars in a piston-cylinder device, heated for 6 hours at 800° C., and quenched to room temperature. After extracting the resultant product with warm water and dispersing out some fine powder, clear and colorless crystals, some up to 1 mm. in cross-section and having a polyhedral shape, were isolated.

X-ray precession photographs taken on one of these single crystals indicated this material to have rhombohedral symmetry in space group $R\bar{3}c$ with hexagonal cell dimensions, $a=4.46$ A.; $c=13.75$ A. An X-ray diffraction powder pattern was obtained upon these crystals with a Hägg-Guinier camera using monochromatic Cu radiation and a KCl internal standard ($a=6.2931$ A.). This powder pattern, Table III below, was indexed on the basis of calcite-type unit cell ($R\bar{3}c$ extinctions) with hexagonal indices, $a=4.463$ A., $c=13.746$ A. in agreement with the results of the single crystal X-ray measurements and indicative of the compound $AlBO_3$. Analysis of these crystals for oxygen gave 55.85%; calculated for $AlBO_3$, 55.95%.

Two crystals of this $AlBO_3$, about 1 mm. in cross-section, were mounted and polished and their microhardness was determined. At a loading of 100 g., a Knoop hardness ($KHN_{100}$) in the range 1597–1727 for one of the crystals and 1658–1777 for the other was obtained.

EXAMPLE 4

A 0.888 g. pellet made from a mixture of 1.427 g. (14.0 mmoles) of $Al_2O_3$ and 1.267 g. (18.2 mmoles) of $B_2O_3$, and contained in a BN capsule was pressured to 10 kbars in a piston-cylinder device, heated for 4 hours at 900° C., and quenched to room temperature. The resultant clear, colorless, sintered, grain-like product had a Debye-Scherrer X-ray diffraction pattern that, after deletion of several weak unidentified lines, was identical to those of the products of Examples 1–3, indicating formation of calcite-type $AlBO_3$. A comparable reaction carried out in a welded Pt capsule also gave the same material as was obtained in BN.

The utility of the $AlBO_3$ was shown in this manner: a sample of $AlBO_3$ pulverized to a powder (to pass through a 325-mesh screen) was found to remove scratches put into stainless steel by No. 600 emery paper. A standard wet, hand-polishing technique was employed to remove the scratches.

When the above reactions were repeated in BN or Pt at 900° C. but at the lower pressure of 5 kbars, the known borates $2Al_2O \cdot B_2O_3$ and $9Al_2O_3 \cdot 2B_2O_3$ were formed rather than calcite-type $AlBO_3$.

EXAMPLE 5

Chromium-doped $AlBO_3$

A 0.162 g. pellet made from a mixture of 1.0194 g. (10.0 mmoles) of $Al_2O_3$, 1.5460 g. (25.0 mmoles) of $H_3BO_3$, and 0.0076 g. (0.05 mmole) of $Cr_2O_3$, and contained in a gold capsule was pressured to 65 kbars in a tetrahedral anvil device and heated for 2 hours at 1000° C., slow cooled for 6 hours to 400° C., and thereafter quenched to room temperature. The product comprised in part a light pink center section which was isolated and extracted with hot water. The resultant crystal powder was observed to have a Debye-Scherrer X-ray diffraction powder pattern that was identical to that of calcite-type $AlBO_3$ (Examples 1–4).

The novel calcite-type $AlBO_3:Cr$ of this example displayed bright red luminescence under 3660 A. ultraviolet excitation, weak red luminescence under 2537 A. ultraviolet excitation, and moderate red-orange cathodoluminescence when bombarded in vacuo with low voltage ions, thus demonstrating the doping of the nonluminescent host $AlBO_3$ with Cr to give luminescent $AlBO_3:Cr$.

The above reaction was repeated at a pressure of 25 rather than 65 kbars. Pale pink platelets of red-luminescent $AlBO_3:Cr$ were isolated.

EXAMPLE 6

Chromium-doped $AlBO_3$

A 0.173-g. pellet made from a mixture of 1.0194 g. (10.0 mmoles) of $Al_2O_3$, 0.9053 g. (13.0 mmoles) of $B_2O_3$, and 0.0076 g. (0.05 mmole) of $Cr_2O_3$, and contained in a gold capsule was pressured to 25 kbars in a tetrahedral anvil device and heated in the manner of Example 5. Crystals of $AlBO_3:Cr$ having the calcite-type structure and red luminescence under ultraviolet light were isolated as in Example 5. A differential thermal analysis carried out on this material in an atmosphere of argon showed that it is thermally stable until about 1000° C.

EXAMPLE 7

Chromium-doped $AlBO_3$

A 0.443-g. pellet made from a mixture of 1.994 g. (15.4 mmoles) of $Al(OH)_3$, 0.9053 g. (13.0 mmoles) of $B_2O_3$, and 0.0076 g. (0.05 mmole) of $Cr_2O_3$, and contained in a welded platinum capsule was pressured to 25 kbars in a piston-cylinder device, heated for 2 hours at 1000° C., slow cooled for 4 hours to 400° C., and thereafter quenched to room temperature. After extracting the resultant product with warm water, clear, pale-pink crystals of $AlBO_3:Cr$ were isolated. An X-ray diffraction powder pattern was obtained upon these crystals with a Hägg-Guinier camera in the manner of Example 3. This powder pattern, Table IV below, was indexed on the basis of a calcite-type unit cell ($R\bar{3}c$ extinctions) with hexagonal indices, $a=4.464$A., $c=13.750$ A., indicating essentially the same size unit cell as for the undoped $AlBO_3$ host.

The novel $AlBO_3:Cr$ calcite-type crystals of this example displayed a deep red luminescence peaking at about 6400 A. when irradiated with 3660 A. ultraviolet light.

The same ratio of reactants was heated in the same manner as above except that the pressure was 5 rather than 25 kbars. At this lower pressure, a mixture of the known borates $9Al_2O_3 \cdot 2B_2O_3$ and $2Al_2O_3 \cdot B_2O_3$ was formed rather than Cr-doped calcite-type $AlBO_3$.

EXAMPLE 8

Europium-doped $AlBO_3$

A 0.174-g. pellet made from a mixture of 1.0194 g. (10.0 mmoles) of $Al_2O_3$, 0.9053 g. (13.0 mmoles) of $B_2O_3$, and 0.0176 g. (0.05 mmole) of $Eu_2O_3$, and contained in a gold capsule was pressured to 25 kbars in a tetrahedral anvil device and heated for 2 hours at 1000° C., slow cooled for 6 hours at 400° C., and thereafter quenched to room temperature. The resultant product was then extracted with hot water and a colorless, crystalline solid was isolated. This material had a Debye-Scherrer X-ray diffraction powder pattern that was identical to that of calcite-type $AlBO_3$ (Examples 1–7).

The novel $AlBO_3$:Eu calcite-type crystals of Example 8 displayed a faint red luminescence under 3660 A. ultraviolet light and a much brighter red-orange luminescence under 2537 A. ultraviolet light, thus demonstrating the doping of the nonluminescent host $AlBO_3$ with Eu to give the luminescent $AlBO_3$:Eu.

EXAMPLE 9

A 0.171-g. pellet made from a mixture of 0.210 g. (1.0 mmole) of $RhCl_3$ and 0.414 g. (3.0 mmoles) of $NaBO_2 \cdot 4H_2O$, and contained in a gold capsule was pressured to 65 kbars in a tetrahedral anvil device and heated for 2 hours at 1000° C., slow cooled for 3 hours to 400° C., and thereafter quenched to room temperature. The resultant product was then extracted with hot water to remove soluble impurities. A mixture of white (cubic $HBO_2$) and deep red-brown crystals was obtained. Some of the latter were isolated and a Debye-Scherrer X-ray diffraction powder pattern was obtained thereon. After deletion of a few weak lines belonging in part to Rh metal, the X-ray pattern, Table V below, was then indexed on the basis of a calcite-type unit cell ($R\bar{3}c$ extinctions) with hexagonal indices, $a=4.640$ A., $c=14.351$ A., indicative of the compound $RhBO_3$.

EXAMPLE 10

A 0.190-g. pellet made from a mixture of 0.412 g. (1.63 mmoles) of $Rh_2O_3$ and 0.371 g. (6.0 mmoles) of $H_3BO_3$, and contained in a gold capsule was pressured to 65 kbars in a tetrahedral anvil device, heated for 6 hours at 800° C. and quenched to room temperature. The resultant product was treated with hot water and a brown sludge was dispersed out. Deep red-brown crystals of $RhBO_3$ remainded, the majority being greater than 200 mesh in size. Their Debye-Scherrer X-ray diffraction powder pattern was indexed on the basis of a single-phase, calcite-type unit cell with, $a=4.640$ A., $c=14.351$ A., identical to that of Example 9. Analysis for oxygen gave 29.16%; calculated for $RhBO_3$, 29.68%.

Crystals of $RhBO_3$ derived by the procedure of this example were mounted in plastic and a microhardness measurement was made on polished flat sections of said crystals. Even with diamond dust, polishing of the crystals was difficult because of their extreme hardness. At a loading of 100 g., a Knoop hardness ($KHN_{100}$) of around 2500 was obtained. The extreme hardness makes $RhBO_3$ useful as a polishing agent.

EXAMPLE 11

A 0.410-g. pellet made from a mixture of 0.932 g. (3.5 mmoles) of $TlNO_3$ and 0.122 g. (1.75 mmoles) of $B_2O_3$ and contained in a gold capsule was pressured to 65 kbars in a tetrahedral anvil device, heated for 2 hours at 1000° C., slow cooled for 4 hours to 400° C., and thereafter quenched to room temperature. The resultant product was then extracted with hot water to remove soluble impurities. A mixture of dark crystals and light yellow-brown powder resulted. The light colored powder was isolated and a Debye-Scherrer X-ray diffraction powder pattern was obtained thereon. After deletion of a few weak lines that belonged to the unidentified, dark crystalline phase, the X-ray pattern, Table VI below, was then indexed on the basis of a calcite-type unit cell ($R\bar{3}c$ extinctions) with hexagonal indices, $a=4.932$ A., $c=15.988$ A., indicative of the compound $TlBO_3$ in which $Tl^{+3}$ has been formed by oxidation of $Tl^{+1}$ with the $NO_3^-$ anion species present in the reaction mixture. The powder characterized by X-ray diffraction as $TlBO_3$, although not suitable for measurement of hardness, when rubbed between quartz plates clearly scratched the quartz. The extreme hardness, in excess of the hardness of quartz which is about 820 ($KHN_{100}$), makes $TlBO_3$ useful for metal polishing.

TABLE I.—X-RAY DIFFRACTION POWDER PATTERN OF $AlBO_3$

[Product of Example 1]

| Intensity | h | k | l | d Spacing, A. |
|---|---|---|---|---|
| 50 | 1 | 0 | 2 | 3.38 |
| 100 | 0 | 1 | 4 | 2.57 |
| 20 | 0 | 0 | 6 | 2.29 |
| 10 | 1 | 1 | 0 | 2.23 |
| 100 | 1 | 1 | 3 | 2.01 |
| 50 | 0 | 2 | 2 | 1.86 |
| 30 | 2 | 0 | 4 | 1.69 |
| 75 | 1 | 1 | 6 | 1.60 |
| 30 | 1 | 0 | 8 | 1.57 |
| 5 | 1 | 2 | 1 | 1.45 |
| 25 | 2 | 1 | 2 | 1.43 |
| 35 | 1 | 2 | 4 | 1.35 |
| 65 | 3 | 0 | 0 | 1.29 |
| 20 | 1 | 1 | 9 | 1.26 |
| 10 | 0 | 0 | 12 | 1.15 |
| 5 | 3 | 0 | 6 | 1.12 |
| 15 | 2 | 1 | 8 | 1.11 |
| 10 | 2 | 2 | 3 | 1.08 |
| 2 | 1 | 3 | 2 | 1.06 |
| 25 | 3 | 1 | 4 | 1.02 |
| 20 | 2 | 2 | 6 | 1.00 |
| 20 | 2 | 2 | 6 | 1.00 |
| 15 | 0 | 4 | 4 | 0.930 |
| 15 | 1 | 3 | 8 | 0.910 |
| 5 | 2 | 2 | 9 | 0.901 |
| 5 | 3 | 2 | 2 | 0.880 |
| 5 | 0 | 2 | 14 | 0.875 |
| 10 | 2 | 3 | 4 | 0.859 |
| 40 | 0 | 3 | 12 | 0.856 |
| 10 | 1 | 1 | 15 | 0.848 |
| 10 | 4 | 0 | 8 | 0.842 |
| 2 | 0 | 1 | 16 | 0.839 |
| 15 | 4 | 1 | 3 | 0.830 |
| 5 | 2 | 1 | 14 | 0.815 |
| 5 | 2 | 2 | 12 | 0.799 |
| 25 | 1 | 4 | 6 | 0.792 |
| 10 | 3 | 2 | 8 | 0.788 |

TABLE II.—X-RAY DIFFRACTION POWDER PATTERN OF $AlBO_3$

[Product of Example 2]

| Intensity* | h | k | l | d Spacing, A. |
|---|---|---|---|---|
| 60 | 1 | 0 | 2 | 3.371 |
| 100 | 0 | 1 | 4 | 2.569 |
| 35 | 0 | 0 | 6 | 2.291 |
| 15 | 1 | 1 | 0 | 2.231 |
| 100 | 1 | 1 | 3 | 2.007 |
| 55 | 0 | 2 | 2 | 1.861 |
| 35 | 2 | 0 | 4 | 1.685 |
| 80 | 1 | 1 | 6 | 1.599 |
| 40 | 1 | 0 | 8 | 1.570 |
| 10 | 1 | 2 | 1 | 1.453 |
| 30 | 2 | 1 | 2 | 1.429 |
| 35 | 1 | 2 | 4 | 1.345 |
| 80 | 3 | 0 | 0 | 1.289 |
| 25 | 1 | 1 | 9 | 1.261 |
| 10 | 0 | 0 | 12 | 1.146 |
| 10 | 2 | 1 | 8 | 1.113 |
| 10 | 2 | 2 | 3 | 1.084 |
| 2 | 1 | 3 | 2 | 1.059 |
| 20 | 3 | 1 | 4 | 1.023 |
| 20 | 2 | 2 | 6 | 1.003 |
| 15 | 0 | 4 | 4 | 0.9302 |
| 25 | 1 | 3 | 8 | 0.9095 |
| 10 | 2 | 2 | 9 | 0.9010 |
| 10 | 3 | 2 | 2 | 0.8793 |
| 10 | 2 | 3 | 4 | 0.8586 |
| 45 | 0 | 3 | 12 | 0.8561 |
| 5 | 1 | 1 | 15 | 0.8476 |
| 5 | 4 | 1 | 0 | 0.8434 |
| 15 | 4 | 0 | 8 | 0.8423 |
| 10 | 4 | 1 | 3 | 0.8295 |
| 5 | 2 | 1 | 14 | 0.8149 |
| 30 | 1 | 4 | 6 | 0.7916 |
| 15 | 3 | 2 | 8 | 0.7880 |

TABLE III.—X-ray Diffraction Powder Pattern of AlBO₃

[Product of Example 3]

| Intensity* | h | k | l | d Spacing, A. |
|---|---|---|---|---|
| 40 | 1 | 0 | 2 | 3.3670 |
| 95 | 0 | 1 | 4 | 2.5679 |
| 35 | 0 | 0 | 6 | 2.2912 |
| 100 | 1 | 1 | 3 | 2.0064 |
| 45 | 0 | 2 | 2 | 1.8605 |
| 25 | 2 | 0 | 4 | 1.6844 |
| 80 | 1 | 1 | 6 | 1.5985 |
| 45 | 1 | 0 | 8 | 1.5700 |
| 5 | 1 | 2 | 1 | 1.4526 |
| 30 | 2 | 1 | 2 | 1.4289 |
| 45 | 1 | 2 | 4 | 1.3445 |
| 5 | 0 | 1 | 10 | 1.2953 |
| 85 | 3 | 0 | 0 | 1.2883 |

TABLE IV.—X-Ray Diffraction Powder Pattern of AlBO₃$Cr

[Product of Example 7]

| Intensity* | h | k | l | d Spacing, A. |
|---|---|---|---|---|
| 45 | 1 | 0 | 2 | 3.3676 |
| 95 | 0 | 1 | 4 | 2.5684 |
| 40 | 0 | 0 | 6 | 2.2912 |
| 100 | 1 | 1 | 3 | 2.0065 |
| 50 | 0 | 2 | 2 | 1.8608 |
| 30 | 2 | 0 | 4 | 1.6847 |
| 75 | 1 | 1 | 6 | 1.5991 |
| 45 | 1 | 0 | 8 | 1.5710 |
| 5 | 1 | 2 | 1 | 1.4533 |
| 30 | 2 | 1 | 2 | 1.4294 |
| 40 | 1 | 2 | 4 | 1.3447 |
| 5 | 0 | 1 | 10 | 1.2954 |
| 70 | 3 | 0 | 0 | 1.2884 |
| 30 | 1 | 1 | 9 | 1.2605 |

TABLE V.—X-ray Diffraction Powder Pattern of RhBO₃

[Product of Example 9]

| Intensity* | h | k | l | d Spacing, A. |
|---|---|---|---|---|
| 100 | 0 | 1 | 2 | 3.508 |
| 100 | 1 | 0 | 4 | 2.677 |
| 20 | 0 | 0 | 6 | 2.389 |
| 95 | 1 | 1 | 0 | 2.320 |
| 45 | 1 | 1 | 3 | 2.088 |
| 90 | 2 | 0 | 2 | 1.935 |
| 65 | 0 | 2 | 4 | 1.753 |
| 95 | 1 | 1 | 6 | 1.665 |
| 70 | 0 | 1 | 8 | 1.638 |
| 75 | 1 | 2 | 2 | 1.486 |
| 70 | 2 | 1 | 4 | 1.339 |
| 30 | 1 | 0 | 10 | 1.351 |
| 70 | 3 | 0 | 0 | 1.339 |
| 5 | 1 | 1 | 9 | 1.314 |
| 10 | 0 | 0 | 12 | 1.196 |
| 35 | 3 | 0 | 6 | 1.168 |
| 50 | 1 | 2 | 8 | 1.159 |
| 25 | 3 | 1 | 2 | 1.101 |
| 50 | 1 | 1 | 12 | 1.064 |
| 50 | 2 | 1 | 10 | 1.043 |
| 10 | 0 | 1 | 14 | 0.9937 |
| 20 | 4 | 0 | 4 | 0.9670 |
| 30 | 3 | 1 | 8 | 0.9464 |
| 30 | 2 | 3 | 2 | 0.9140 |
| 50 | 3 | 0 | 12 | 0.8921 |
| 25 | 1 | 3 | 10 | 0.8800 |
| 45 | 0 | 4 | 8 | 0.8765 |
| 25 | 1 | 2 | 14 | 0.8495 |
| 25 | 2 | 2 | 12 | 0.8325 |
| 60 | 4 | 1 | 6 | 0.8231 |
| 30 | 2 | 3 | 8 | 0.8198 |
| 20 | 0 | 2 | 16 | 0.8189 |
| 20 | 5 | 0 | 2 | 0.7986 |
| 20 | 0 | 5 | 4 | 0.7842 |
| 45 | 3 | 2 | 10 | 0.7756 |
| 35 | 3 | 3 | 0 | 0.7733 |
| 35 | 2 | 1 | 16 | 0.7723 |

TABLE VI.—X-RAY DIFFRACTION POWDER PATTERN OF TlBO₃

[Product of Example 11]

| Intensity* | h | k | l | d Spacing, A |
|---|---|---|---|---|
| 100 | 0 | 1 | 2 | 3.758 |
| 100 | 1 | 0 | 4 | 2.912 |
| 20 | 0 | 0 | 6 | 2.657 |
| 65 | 1 | 1 | 0 | 2.462 |
| 10 | 1 | 1 | 3 | 2.235 |
| 60 | 2 | 0 | 2 | 2.061 |
| 5 | 1 | 0 | 7 | 2.003 |
| 45 | 0 | 2 | 4 | 1.881 |
| 95 | 1 | 1 | 6 | 1.808 |
|    | 0 | 1 | 8 |       |
| 60 | 1 | 2 | 2 | 1.580 |
| 70 | 2 | 1 | 4 | 1.495 |
|    | 1 | 0 | 10 |      |
| 30 | 2 | 0 | 8 | 1.458 |
| 25 | 3 | 0 | 0 | 1.422 |
| 5 | 0 | 0 | 12 | 1.332 |
| 20 | 0 | 2 | 10 | 1.280 |
| 50 | 3 | 0 | 6 | 1.255 |
|    | 1 | 2 | 8 |       |
| 10 | 2 | 2 | 0 | 1.233 |
| 40 | 3 | 1 | 2 | 1.172 |
|    | 1 | 1 | 12 |      |
| 50 | 1 | 3 | 4 | 1.136 |
|    | 2 | 1 | 10 |      |
| 20 | 2 | 2 | 6 | 1.119 |
| 10 | 0 | 1 | 14 | 1.103 |
| 10 | 0 | 4 | 2 | 1.059 |
| 20 | 4 | 0 | 4 | 1.032 |
| 25 | 3 | 1 | 8 | 1.019 |
| 15 | 2 | 0 | 14 | 1.007 |
| 55 | 1 | 0 | 16 | .9730 |
|    | 3 | 0 | 12 |      |
|    | 2 | 3 | 2 |       |
| 30 | 1 | 3 | 10 | .9520 |
|    | 3 | 2 | 4 |       |
| 10 | 0 | 4 | 8 | .9421 |
| 35 | 1 | 2 | 14 | .9325 |
|    | 4 | 1 | 0 |       |
| 30 | 0 | 2 | 16 | .9054 |
|    | 2 | 2 | 12 |      |
| 15 | 0 | 0 | 18 | .8885 |
|    | 4 | 0 | 10 |      |
| 40 | 2 | 3 | 8 | .8803 |
|    | 4 | 1 | 6 |       |
| 30 | 2 | 1 | 16 | .8502 |
|    | 5 | 0 | 2 |       |
| 50 | 1 | 1 | 18 | .8361 |
|    | 3 | 2 | 10 |      |
|    | 0 | 5 | 4 |       |
| 30 | 3 | 1 | 14 | .8228 |
|    | 3 | 3 | 0 |       |
| 25 | 4 | 2 | 2 | .8038 |
| 40 | 0 | 1 | 20 | .7863 |

The embodiments of the invention in which an exclusive property or privilege is claimed are defined as follows:

1. A compound of the formula, MBO₃, wherein M is selected from the group consisting of aluminum, rhodium and thallium, said compound characterized by calcite-type crystal structure with symmetry corresponding to space group R3̄c.

2. A compound according to claim 1, AlBO₃, wherein the unit cell dimensions of the calcite-type crystal on the basis of hexagonal indexing are
   $a = 4.46$ A. and
   $c = 13.75$ A.

3. A compound according to claim 1, RhBO₃, wherein the unit cell dimensions of the calcite-type crystal on the basis of hexagonal indexing are
   $a = 4.64$ A. and
   $c = 14.35$ A.

4. A compound according to claim 1, TlBO₃, wherein the unit cell dimensions of the calcite-type crystal on the basis of hexagonal indexing are
   $a = 4.93$ A. and
   $c = 15.99$ A.

5. A process for making a compound of claim 1 comprising:
   (a) making a mixture of:
       (i) a metal-containing compound wherein said metal is aluminum, rhodium or thallium; and
       (ii) a boron-containing compound,
   said metal-containing compound and said boron-containing compound, when subjected to heat in the presence of each other, yielding respectively $M_2O_3$, wherein M is said metal, and $B_2O_3$; and (b) subjecting said mixture to a pressure of about 10–65 kilobars and a temperature
   (i) of at least 600° C. when M is thallium, or
   (ii) within the range of about 800° C. to 1200° C. when M is aluminum or rhodium.

References Cited

UNITED STATES PATENTS

| | | | |
|---|---|---|---|
| 3,080,242 | 3/1963 | Berry | 23—59 X |
| 3,164,442 | 1/1965 | Bommer et al. | 23—59 |
| 3,350,166 | 10/1967 | Alley et al. | 23—59 |

OTHER REFERENCES

Goldschmidt et al.: "Chemical Abstracts," vol. 26, 1932, p. 4990.

Steele et al.: "The Journal of Chemical Physics," vol. 25, 1956, pp. 1184–1188.

Weir et al.: "Journal of Research, Bureau of Standards," vol. 65 A, May–June 1961, pp. 173–183.

HERBERT T. CARTER, Primary Examiner

U.S. Cl. X.R.

51—307; 252—301.4